Figure 1:
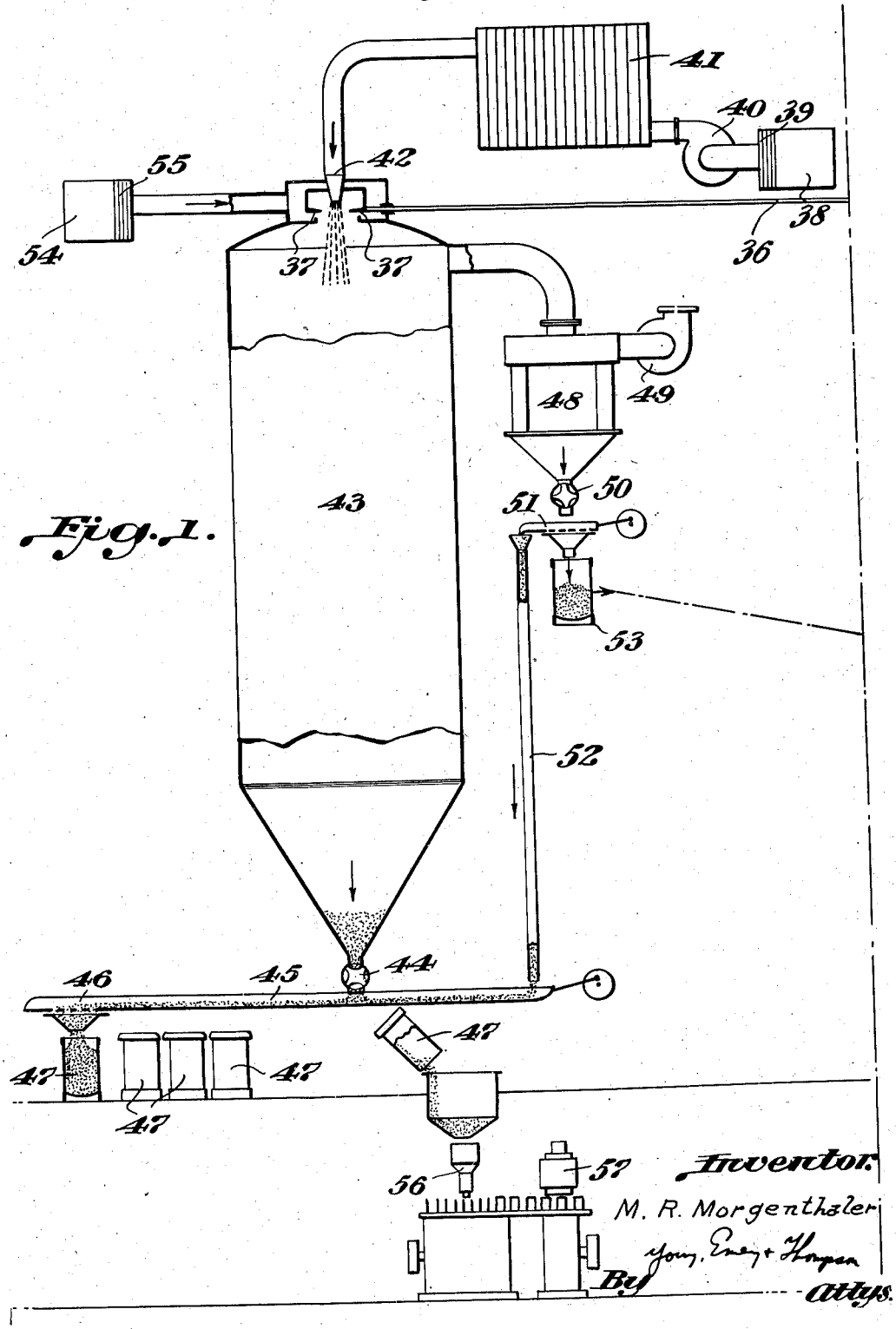
Figure 1B:
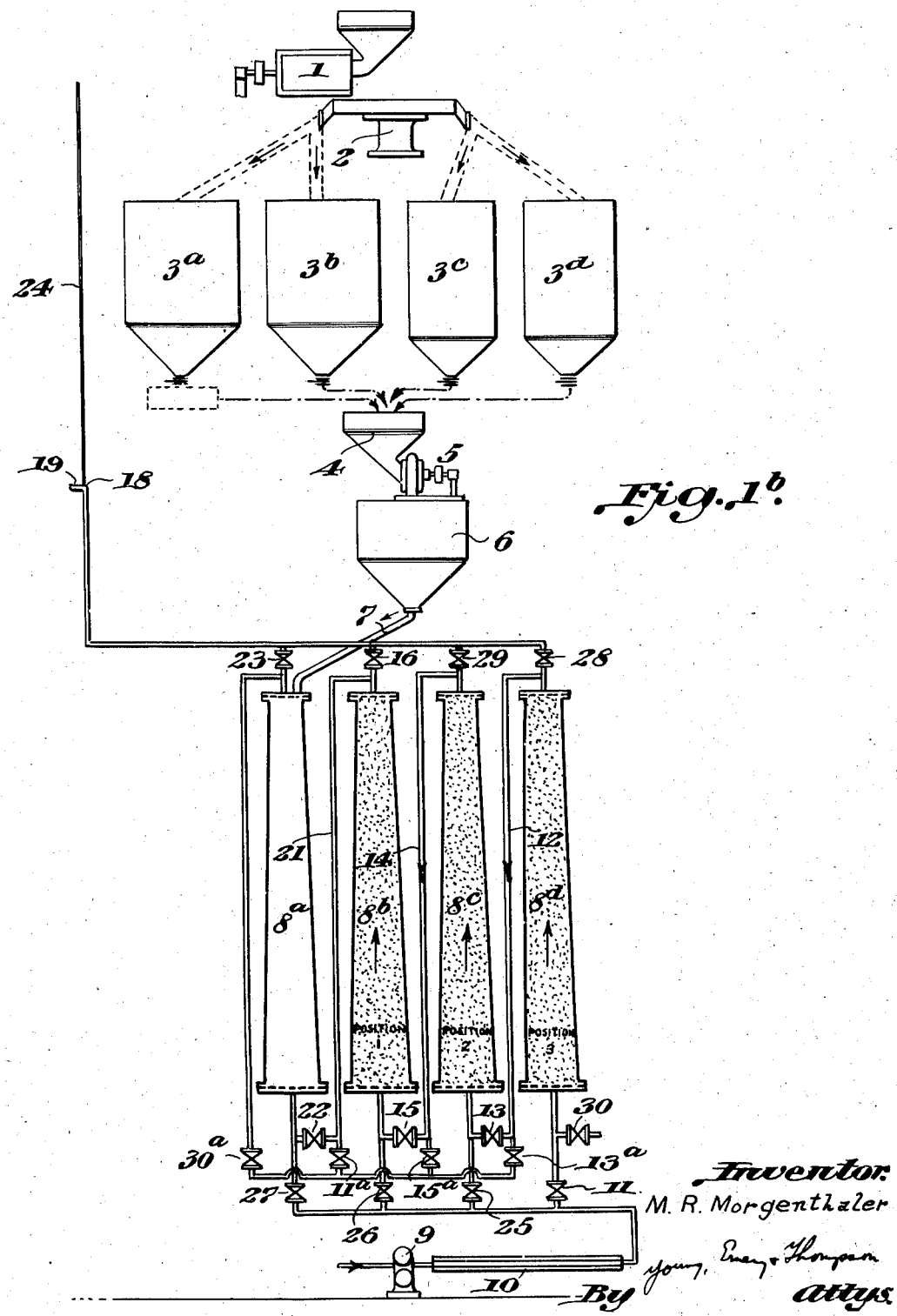

July 20, 1943.  M. R. MORGENTHALER  2,324,526
PROCESS FOR THE MANUFACTURE OF SOLUBLE DRY EXTRACTS
Filed Aug. 8, 1940  3 Sheets-Sheet 1

Inventor:
M. R. Morgenthaler
By ——— Attys.

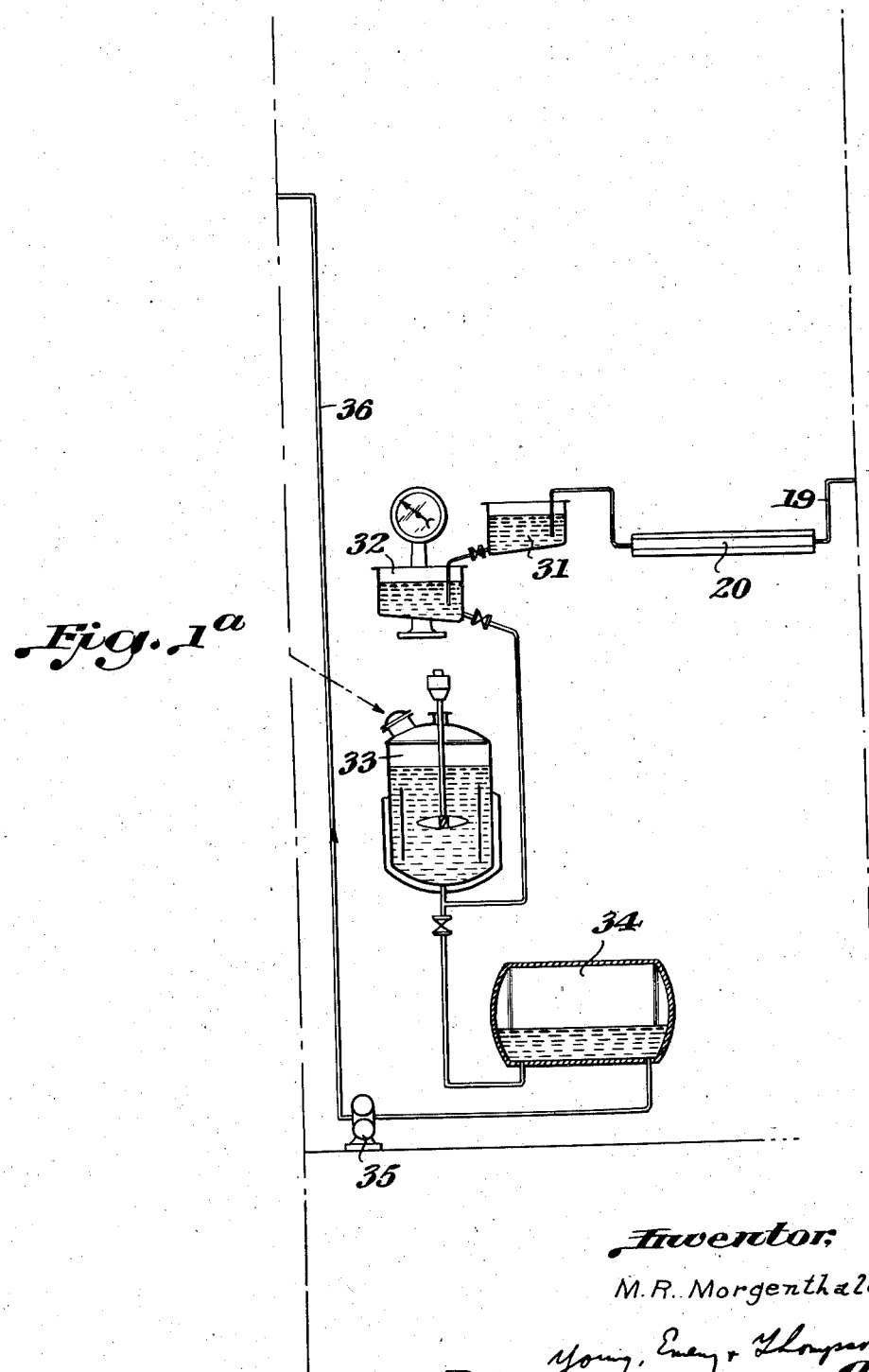

Patented July 20, 1943

2,324,526

UNITED STATES PATENT OFFICE 2,324,526

PROCESS FOR THE MANUFACTURE OF SOLUBLE DRY EXTRACTS

Max Rudolf Morgenthaler, Vevey, Switzerland, assignor to Inredeco, Inc., Panama City, Panama, a corporation of Panama Application August 8, 1940, Serial No. 351,802 In Switzerland February 18, 1937

13 Claims. (Cl. 99—71)

The present invention relates to an apparatus and a process for obtaining in liquid form, by means of percolation, the volatile, soluble constituents of a product which swells when said product is impregnated with water or any other liquid. The liquid thus obtained can be subsequently reduced to a dry or powdered form, with or without the addition of aroma-sealing agents. The invention also relates to an improved dry powdered extract of said product.

The present application is a continuation-in-part of applicant's copending application, Serial No. 320,938, filed February 26, 1940, the latter being a continuation-in-part of applicant's copending application, Serial No. 260,218, filed March 6, 1939, and the latter being a continuation-in-part of the original application filed June 29, 1937, Serial No. 151,058.

The main object of the present invention is to produce an improved product by a novel process and in a novel apparatus and of which certain advantages and objects will be apparent from the following description taken in connection with the accompanying drawings which are diagrammatic views of the apparatus.

The invention concerns a process of manufacturing a liquid coffee extract, thoroughly filtered and partially defatted, containing as many of the carbohydrates as possible derived from the roasted coffee which is used, preferably in the form of their derivatives, this liquid extract being subsequently supplemented by the addition of carbohydrates derived from other sources, so as to seal most of the aromatic and flavoring substances in the extract when it is spray-dried. Measures are taken to prevent any loss of these aromatic and flavoring substances during the process.

Many soluble carbohydrates and their derivatives have the requisite qualities for retaining aromatic substances. For example, I use the product which is obtained through hydrolysis (by means of acid) of the coffee grounds which remain as a residue from a previous infusion. I can also use the maltose or malto-dextrine obtained by malting such coffee grounds to a given degree, or the product obtained from the combination of the above two processes. Other soluble carbohydrates, such as transformed starch, as for instance malto-dextrine, maltose or glucose, the content of dextrines of which should range approximately 40% to 80%, preferably approximately 60%, prepared from other substances, which are capable of sealing the aromatic substances while in a dry state and releasing them on subsequent solution, can also be used, as well as derivatives therefrom or various mixtures of the above carbohydrates and/or their derivatives.

A process of the countercurrent type with a group of percolating cells is used. The water enters the last cell (in position 3) containing the weakest coffee at the bottom. The water is heated as high as 160° to 175° C. (about 350° F.) and the water leaves the cell at a temperature of about 130° to 135° C. at the top of the cell. By proceeding in this way the grounds contained in said cell, which have already given off their aromatic and flavoring substances in a former stage, release as much as possible of the substances which have been produced by roasting from the original hemi-cellulose of the green coffee. In addition, these carbohydrates are reduced in the heated medium and in the presence of remaining acids (hydrolysis) to lower grade sugars, which are essential for sealing the aroma and flavouring substances of the extract, and capable of releasing same on subsequent solution.

When roasted coffee is extracted with water whose temperature is not less than about 160° C., the cellulose or hemi-cellulose of the roasted coffee is hydrolyzed. As later stated herein, the liquid coffee extract which is secured by treating roasted coffee with water whose temperature is not less than 160° C., contains about 7% of solids by weight. Therefore the percentage of dissolved carbohydrate in such liquid coffee extract, which has been secured by said hydrolysis, is less than 7% by weight, because said liquid coffee extract contains dissolved caffeine and other ingredients in addition to the product or products of hydrolysis. In the liquid coffee extract which is thus secured, the proportion of the products of said hydrolysis is about 6% by weight of the liquid coffee extract. This is much less than the maximum amount of such carbohydrates which can be dissolved in water. Hence, when roasted and ground coffee is treated with water at a temperature of at least about 160° C., the solution of said hydrolysis products in the water does not prevent said water from taking up the flavoring ingredients or aromatic ingredients of the roasted and ground coffee, to substantially the same extent as pure hot water. Since the hydrolysis of the hemi-cellulose produces carbohydrates which are dissolved in the hot water, this operation lowers the cost of manufacture of the final dried and powdered coffee extract, but the invention is not necessarily limited to this step.

The quantity of such carbohydrates which are formed during the process depends on the kind of coffee, the degree of roasting and the period of extraction. For a weakly roasted coffee, for instance, it has been found beneficial to arrange two cells in parallel in position 3 and in this way to double the time of extraction of the ground coffee, whereas in a highly roasted coffee all the cells may remain in series. It has further been found that the total carbohydrates in the extract must be a definite minimum percentage of the total solids to ensure perfect sealing. The outgoing extract is, therefore, supplemented by the addition of carbohydrates which are derived from other sources as named above. It has been found that the percentage of carbohydrates in total solids of the final dried extract should range between 60% to 90% by weight and preferably approximately 75%.

It is preferable to use carbohydrates for supplementing which are as colorless, odorless and tasteless as possible. They can be added in solid form or as a solution.

After leaving the last cell (in position 3), the liquid extract passes through one or more intermediate cells (in position 2), where it is further enriched with coffee solids and it is cooled down to a temperature of 100° C. or less. At this temperature, it enters the first cell (in position 1), containing the freshest coffee, which it leaves at a temperature of 70° C. The cloudy liquid which results from the treatment of the spent coffee grounds has fine particles in suspension, which give said liquid its cloudy appearance. By cooling this liquid to 100° C. or less, and by passing said liquid through a suitable mass of coffee grounds, as later described herein, these fine particles are filtered out of said extract.

It is necessary that the extract be filtered and defatted before it is intensively cooled below 15° C., as later described herein. This is done in the process, by using the coffee grounds themselves as a filter, by applying a percolating column of sufficient length and grinding the coffee to a suitable fine grain. It is rather difficult to set forth exact indications and figures as to the size of the ground coffee particles. It is well known that when grinding coffee, particles of various sizes will be obtained; the smaller particles cannot be eliminated before preparing the infusion, so that the percolator will be filled with particles of various sizes. It is also known that the smaller the coffee particles, the better the extraction. However, it has been found that if the coffee beans are ground too fine, that is, if there are more small particles than large particles, the ground coffee will swell as soon as it becomes wet and the entire mass of ground coffee will stick together, forming a cake, so that the percolating water can no longer circulate. It has been found that for a column of 15 metres in length, divided into several cells in series, that is a height of 5 metres for each cell, the size of grain most suitable should not be less than $\frac{1}{12}''$ and not more than $\frac{1}{8}''$, to deprive the extract of its fatty substances up to 85% and to yield a perfectly clear extract. A further purpose of the high filtering column, in combination with the high temperature of the fresh water entering the last cell, is to make the manufacture independent of the quality of fresh water available. All foreign substances in the water are precipitated and remain filtered in the grounds of the last cell.

In the cell in position 1, where the aromatic substances are extracted, it is particularly important that no air comes into contact with the extract. Great care must therefore be taken, when filling each cell, to ensure that the ground coffee is packed as evenly and as compactly as possible and that the extract coming from the cell in position 2 enters and mounts slowly until the cell is filled. In this way the developing carbon-dioxide forms a cushion above the wetted coffee and separates it and the extract from the escaping air.

The resulting extract is immediately and intensively cooled (below 15° C.) and at once mixed with a cold solution of carbohydrates or dry carbohydrates, before drying.

Besides the necessity of standardising the carbohydrates in the cooled coffee extract—for the reasons given above—a high total solid content is of importance, since it is a well-known fact that in spray-drying a certain specific weight is required to obtain a specific size of grain in the finished product. In a spray drier certain small particles are always carried off by air and recovered in a cyclone separator or in a filter. The part thus recovered is sifted and the particles which are too fine to be used are re-dissolved in the extract before spraying. They are thus reworked in the spray drier to obtain for themselves and the rest of the solids the desired coarser size of grain. The same result can be attained by freezing out a certain amount of water from the liquid extract before spraying, if not sufficient fine particles are available for addition.

The same process is applicable to coffee substitutes (chicory, etc.) or a mixture of the latter with coffee.

There are, of course, various ways and different types of apparatus which enable practical use to be made of the invention, and the process is not confined to any one particular adaptation. As an illustration of one possible arrangement, the mechanism illustrated is intended for the preparation of a liquid coffee extract which, as a final product, takes the form of a granulated dry mass.

In carrying out the method, the coffee is first roasted in roaster 1 and cooled in cooler 2. From these the coffee is conveyed into bins 3a, 3b, 3c, 3d, each of which holds only one quality of coffee. By opening the valves placed at the bottom of the bins 3a, 3b, 3c, 3d, the required quantities of each quality of coffee fall on to a movable scale, not shown, are weighed and delivered into hopper 4 where the desired blend is assembled and mixed. The coffee is then ground in mill 5 to a specific fineness and collected in bin 6.

From the bin 6 the roasted coffee is brought through a movable pipe 7 into the various cells 8a, 8b, 8c, 8d, and care is taken to fill the cells evenly by means of a shaker, not shown, thus forming a compact coffee column inside each cell. The extracting water is forced from pump 9 into heater 10, where it is brought up to a temperature of 160° to 175° C. The water enters, for instance, through valve 11 into the bottom of the last cell 8d and flows upwardly through the roasted ground coffee which is held back by a sieve, not shown, of large mesh, which is placed at the top of the cell. The coffee extract then leaves the last cell 8d through pipe 12 and valve 13, enters the bottom of the intermediate cell 8c, flows upward through this cell, leaves through pipe 14 and valve 15, enters the bottom of the first cell 8b and the coffee extract then flows upwardly and out through the top of cell 8b. In this way three or more cells are operated in series. It is also possible, by adjusting the inlet valves 14, 25, 26, 27 to connect the cells in such a way as to operate two cells in parallel in the position of the last cell and to add on to these the subsequent cell or cells in series. In this case, for instance, the water from heater 10 enters cells 8d and 8c simultaneously through valves 11 and 25. The extract leaves these two cells through pipe 12, valve 13a, 15a and pipe 14. The extract then enters cell 8b through valve 15. During the process of extraction, the extract is increased in concentration and its temperature is lowered, so that the temperature of the extract is 70° C. at the outlet of the first cell 8b.

The respective outer walls of the cells are cooled in order to control the temperature throughout the process. The extract finally leaves through valve 16, pipe 17, junction 18 and pipe 19 into cooler 20 where its temperature is reduced to approximately 12° C.

During this period of extraction, cell 8a is filled with freshly ground coffee. When the desired quantity of extract has been drawn from cell 8b, valve 16 is closed and valve 22 opened, permitting the extract from cell 8b to flow through pipe 21 upwardly into cell 8a. The extract is then permitted to rise slowly in cell 8a, and in rising said extract pushes the air out of cell 8a. The carbon dioxide which is freed when the extract comes into contact with the ground coffee, separates air from the extract. The air and carbon dioxide escape through valve 23, pipe 17 and pipe 24 into the atmosphere until the coffee extract starts to flow through valve 23, pipe 17, junction 18 and pipe 19 into cooler 20. At this moment, cell 8d is disconnected by closing valve 11, and the water of extraction is now led into the bottom of cell 8c, by opening valve 25, and thus the extraction continues. Cell 8d is emptied as quickly as possible by opening the trap door at its bottom, not shown, and permitting the coffee grounds to drop out, which operation is facilitated by the conical shape of the cell. After closing its trap door and opening its cover, the cell 8d is again filled with freshly ground coffee in the way already described, and said cell 8d is ready for a new extraction. Cells 8b and 8c will be successively like cell 8d, and the flow of the extract is controlled in the same way by operating the corresponding valves. Thus continuous extraction is obtained by operating the various cells in rotation.

The cooled extract which comes out of cooler 20, flows into vat 31, where it accumulates. The extract then flows into weighing scale container 32, where the quantity as well as the content of total solids and the content of carbohydrates are determined. The extract is then permitted to flow into mixing vat 33. The necessary additional carbohydrates for providing the total percentage of carbohydrates, are weighed in scale 32 and said additional carbohydrates also flow into mixing vat 33. Supplementation of the concentration is then completed by adding a sufficient quantity of fine powdered coffee extract, which has collected in container 53 of the drying plant. The solution is thoroughly mixed in mixing vat 33 and it is stored in vat 34. Each of the vats 33 and 34 is provided with a cooling jacket. The extract is cooled below 15° C., and to about 12° C., in order to prevent the volatile constituents of the extract from escaping. For this reason the extract is maintained at low temperature while the additional carbohydrate is dissolved in the water of the extract. I prefer not to use sucrose as additional carbohydrate because the use of sucrose would objectionably sweeten the extract. The carbohydrates mentioned herein retain the aromatic constituents of the coffee of the dry extract, without objectionably sweetening the dried extract.

Pump 35 delivers the cold solution from tank 34 through pipe 36 to spray nozzles 37, where the solution comes into contact with the hot air. This hot air is secured by forcing atmospheric air through the air-conditioner 38 and filter 39 by the fan 40, and finally through the air heater 41 to nozzle 42. By the contact of the sprayed solution with the hot air blast, immediate desiccation takes place. The coarse particles of the powder collect at the bottom of the drying chamber 43 and said coarse particles are discharged through valve 44 on to the vibrator-conveyor 45, where they are cooled on their way to the sieve 46 from which they fall into storage containers 47. The air which is used for drying is sucked off by the fan 49, and when said air passes through the separator 48 any powder particles which said air carries therewith is collected in said separator 48. From the separator 48, the particles are discharged by valve 50 on to sieve 51 which retains the coarser particles. Said coarse particles are delivered through pipe 52 to the conveyor 45, where they are mixed with the coarse powder from chamber 43. The fine particles fall through sieve 51 into container 53 and said fine particles are used for increasing the concentration in mixing vat 33. If additional air is necessary for drying, such air is sucked through air-conditioner 54, filter 55 and said additional air enters the drying chamber 43 at its top.

The powder in drums 47 is stored, and after a certain time said powder is filled, by means of a filling machine 56, into cans which are closed by the closing machine 57, without it being necessary to subject the powder to vacuum or gassing. The rooms where the powder is discharged, cooled, stored and filled are preferably air-conditioned.

The following examples illustrate how the invention may be put into effect.

*Example I*

About 600 kgs. of freshly roasted and ground coffee are placed in a set of cells or percolators of suitable size. Said percolators operate under pressure. Water which is heated to about 160° C. to 175° C. is then circulated through the percolators until about 2000 to 2300 litres of filtered, partially de-fatted liquid coffee extract, with a total solid content of about 7% by weight have been collected at the outlet tube of the refrigerator which is connected to the outlet valves of the percolators. The liquid extract is intensively cooled in the refrigerator to about 12° C. 100 litres of a solution containing about 50% solids by weight and prepared separately beforehand from a product obtained through hydrolysis (by acid) of the coffee grounds which remain from a previous infusion, are added as quickly as possible to about 750 litres of this coffee extract and the mixture, in a cold state, is dried to form powdered particles in a spray-drying plant. If the powder contains about 50% total solids extracted from the coffee, 3 grs. of the powdered coffee extract prepared according to the invention, suffice for one cup of coffee of a capacity of 100 cc.

*Example II*

Instead of coffee, a mixture of coffee and chicory can be used for preparing the infusion.

The latter is made in the same manner as mentioned in Example I, until about 100 litres of liquid coffee-chicory extract, containing about 16% total solids, have been collected. In one litre of this infusion, containing about 160 grs. of total solids, about 160 to 180 grs. of dry malto-dextrine are dissolved as soon as possible and the mixture is dried to powder form in a spray-drying apparatus.

The powder, manufactured according to the present invention, having been thoroughly filtered in the percolators through the swelled coffee grounds, is almost entirely soluble in hot water, milk, etc., that is, it leaves no deposit. It is thus possible to prepare coffee directly in a cup, by adding hot water, preferably just at the boiling point, to the powdered coffee extract, without the formation of any deposit.

Since the powdered coffee extract is highly hygroscopic, said powdered extract must be packed in air-tight containers. If it is packed in this manner, it can be kept for a long period and it will not become rancid, because it is partially de-fatted.

The coffee extract in powder form is practically odorless at normal temperature, thus indicating that the aromatic substances have been effectively sealed and that the quality of the powder, insofar as its content of aromatic substances is concerned, does not deteriorate in course of time.

It is of great importance, in carrying out this process, that the liquid extract resulting from the exhaustive extraction with hot water, be immediately and intensively cooled and it is preferable that the cooled, liquid extract be immediately mixed with the cold solution of carbohydrates and that this mixture be likewise spray-dried at once to form dry particles in order to prevent, as far as possible, the escape of any aroma from the aromatic substances before the aroma is sealed in the dry particles by the carbohydrates.

The process is, of course, also applicable to various other products, which will swell when impregnated with water, and which contain volatile, aromatic substances.

I claim as my invention:

1. A method of making a dry powdered coffee extract from ground and roasted coffee, which consists in extracting said ground and roasted coffee with hot water which is sufficiently low in dissolved carbohydrates so that said hot water makes a liquid coffee extract which is substantially the same as the liquid coffee extract which is made by treating roasting and ground coffee with pure hot water, then cooling said liquid coffee extract, while maintaining said extract in liquid form, to a temperature which is below 15° C. while preventing any substantial escape of the volatile constituents of said coffee from said liquid extract, then dissolving an edible and water-soluble flavor-retaining carbohydrate other than sucrose in said cooled and liquid coffee extract, and then spray-drying the cooled and liquid coffee extract, sufficient carbohydrate being thus dissolved so that the percentage of carbohydrate of the final dried extract is from sixty per cent. to ninety per cent. by weight of the total weight of the dried extract.

2. A method according to claim 1, in which the liquid coffee extract is deprived of a major portion of its fatty substances by filtering said extract by means of said wasted and ground coffee, prior to cooling the liquid extract to a temperature below 15° C.

3. In the art of making a coffee extract, those steps which consist in treating roasted and ground coffee with water at a temperature of at least substantially 160° C. by forcing a current of said water through a mass of said coffee, said temperature of said current of water being sufficiently high to hydrolyze the substances which have been produced by roasting the original hemi-cellulose of the green coffee, said hydrolyzed material being partially dissolved in said current of water and being partially suspended in said current of water, and then filtering out said suspended material from said current of water by passing said current of water, while its temperature is not in excess of substantially 100° C., through a filtering mass of ground coffee.

4. In the art of making a coffee extract, those steps which consist in treating roasted and ground coffee with water at a temperature of at least substantially 160° C., said temperature being sufficiently high to hydrolyze the substances which have been produced by roasting the original hemi-cellulose of the green coffee, then cooling the resultant liquid extract to a temperature not in excess of substantially 100° C., and passing said liquid extract through a filtering mass of ground coffee which filters out the suspended particles of said liquid extract and which deprives the liquid extract of a major portion of its fatty substances.

5. A method of making a dried coffee extract by the counter-current process which consists in treating substantially spent roasted coffee grounds with water at a temperature of at least 160° C., said temperature being sufficiently high to hydrolyze the substances which result from the roasting of the hemi-cellulose of the green coffee, cooling the resultant liquid extract to at least 100° C., passing the cooled liquid extract through a mass of unspent and ground roasted coffee to filter out the particles of said liquid extract and also to filter out the major part of the fatty substances of said liquid extract, then passing the liquid extract through substantially fresh and roasted and ground coffee in an upward direction while substantially protecting the liquid extract from contact with the air which is driven out of the last-mentioned fresh and roasted and ground coffee, then immediately cooling the liquid extract below 15° C., then adding a carbohydrate other than sucrose to said liquid extract while maintaining said liquid extract at a temperature below 15° C., and then spray-drying the aforesaid cooled and liquid extract.

6. A method of producing a dry and powdered coffee extract which consists in extracting roasted and ground coffee with hot water which is sufficiently low in dissolved carbohydrate to produce substantially the same liquid extract as pure hot water, then cooling said liquid extract to a temperature which is sufficiently low to substantially retain the volatile ingredients in said liquid extract, then dissolving edible and water-soluble flavor-retaining carbohydrate other than sucrose in said cooled liquid extract in sufficient proportion to retain the flavoring ingredients of the coffee in the final dry extract, then spray-drying the liquid extract, sufficient flavor-retaining carbohydrate being thus dissolved in said liquid extract so that the total weight of carbohydrate in the dry and powdered extract is from sixty per cent. to ninety per cent. of the total weight of the extract.

7. A method according to claim 6 in which the added carbohydrate is of the same type as the carbohydrate which is an hydrolysis product of the hemi-cellulose of the roasted and ground coffee.

8. A method of making a dry powdered coffee extract from ground and roasted coffee, which consists in extracting said ground and roasted coffee with hot water which is sufficiently low in dissolved carbohydrates so that said hot water makes a liquid coffee extract which is substantially the same as the liquid coffee extract which is made by treating roasted and ground coffee with pure hot water, then cooling said liquid coffee extract, while maintaining said extract in liquid form, to a temperature which is below 15° C. while preventing any substantial escape of the volatile constituents of said coffee from said liquid extract, then dissolving a flavor-retaining carbohydrate other than sucrose in said cooled and liquid coffee extract, and then spray-drying the cooled and liquid coffee extract, sufficient carbohydrate being thus dissolved so that the percentage of carbohydrate of the final dried extract is at least substantially seventy-five per cent. by weight of the total weight of the dried extract.

9. A method of producing a dry and powdered coffee extract, which consists in extracting roasted and ground coffee with hot water which is sufficiently low in dissolved carbohydrate to produce substantially the same aqueous coffee extract as pure hot water, then adding water-soluble aroma-retaining and flavor-retaining edible and water-soluble carbohydrate material other than sucrose to said aqueous coffee extract, in sufficient proportion to protect the aromatic ingredients and the flavoring ingredients of the coffee in the final dry extract, then spray-drying said aqueous extract, enough of said carbohydrate material being thus added to said aqueous extract prior to the spray-drying so that the total weight of carbohydrate material in the dry and powdered extract is from 60% to 90% of the total weight of the extract, said aqueous extract being deprived of a major portion of its fatty substances prior to said spray-drying operation.

10. A method of producing a dry and powdered coffee extract, which consists in extracting roasted and ground coffee with hot water which is sufficiently low in dissolved carbohydrate to produce substantially the same aqueous coffee extract as pure hot water, then adding edible and water-soluble aroma-retaining and flavor-retaining carbohydrate material other than sucrose to said aqueous coffee extract, in sufficient proportion to protect the aromatic ingredients and the flavoring ingredients of the coffee in the final dry extract, then spray-drying said aqueous extract, enough of said carbohydrate material being thus added in said aqueous extract prior to the spray-drying so that the total weight of carbohydrate material in the dry and powdered extract is approximately 75% of the total weight of the extract, said aqueous extract being deprived of a major portion of its fatty substances prior to said spray-drying operation.

11. A method according to claim 9, in which said carbohydrate material is selected from a class which consists of maltose, dextrose, dextrin, derivatives of said substances, mixtures of said substances, and mixtures of said derivatives.

12. A method according to claim 9, in which said carbohydrate material is selected from a class which consists of maltose, dextrose, dextrin, derivatives of said substances, and mixtures of said derivatives.

13. A method according to claim 9, in which said carbohydrate material is substantially the same as the hydrolyzed grounds of roasted and ground coffee beans.

MAX RUDOLF MORGENTHALER.